United States Patent
Hofmann

(10) Patent No.: US 11,685,415 B2
(45) Date of Patent: Jun. 27, 2023

(54) PERSONAL CART AND METHOD FOR USING

(71) Applicant: James Herbert Hofmann, Escondido, CA (US)

(72) Inventor: James Herbert Hofmann, Escondido, CA (US)

(*) Notice: Subject to any disclaimer, the term of this patent is extended or adjusted under 35 U.S.C. 154(b) by 194 days.

(21) Appl. No.: 16/894,759

(22) Filed: Jun. 6, 2020

(65) Prior Publication Data

US 2020/0406947 A1  Dec. 31, 2020

Related U.S. Application Data

(60) Provisional application No. 62/868,148, filed on Jun. 28, 2019.

(51) Int. Cl.
| | |
|---|---|
| *B62B 3/02* | (2006.01) |
| *B62B 3/04* | (2006.01) |
| *B62B 3/10* | (2006.01) |
| *A61H 3/04* | (2006.01) |
| *B62B 5/06* | (2006.01) |
| *A61H 3/00* | (2006.01) |
| *B62B 5/04* | (2006.01) |

(52) U.S. Cl.
CPC ............... *B62B 3/022* (2013.01); *A61H 3/04* (2013.01); *B62B 3/04* (2013.01); *B62B 3/106* (2013.01); *A61H 2003/004* (2013.01); *A61H 2003/046* (2013.01); *A61H 2201/0161* (2013.01); *B62B 5/0438* (2013.01); *B62B 5/06* (2013.01); *B62B 2203/30* (2013.01)

(58) Field of Classification Search
CPC .......... B62B 3/022; B62B 3/04; B62B 3/106; B62B 5/0438; B62B 5/06; B62B 2203/30; A61H 3/04; A61H 2003/004; A61H 2003/046; A61H 2201/0161
See application file for complete search history.

(56) References Cited

U.S. PATENT DOCUMENTS

| | | | | |
|---|---|---|---|---|
| 2,901,262 A | * | 8/1959 | Berlin | B62B 3/027 280/47.35 |
| RE25,616 E | * | 7/1964 | Stanley | B62B 3/148 280/33.993 |

(Continued)

FOREIGN PATENT DOCUMENTS

| | | | |
|---|---|---|---|
| DE | 102021101944 A1 | * | 7/2022 |
| DE | 102021101945 A1 | * | 7/2022 |

(Continued)

*Primary Examiner* — Jacob B Meyer
(74) *Attorney, Agent, or Firm* — John R. Ross; John R. Ross, III

(57) ABSTRACT

A personal cart and method for using the personal cart. The personal cart has a platform support frame. Wheels are rotatably connected to the platform support frame. Handles are also attached to the platform support frame. A rectangular platform is rigidly connected to the platform support frame. The platform has a raised railing extending upwards along the outer perimeter of the platform. In a preferred embodiment the platform support frame is foldable. Also, in a preferred embodiment a plurality of tote bags is placed on the platform. Each tote bag laterally supports another tote bag and the plurality of tote bags is also laterally supported by the raised railing.

8 Claims, 9 Drawing Sheets

(56) References Cited

U.S. PATENT DOCUMENTS

| | | | | |
|---|---|---|---|---|
| 5,046,748 A * | 9/1991 | Oat-Judge | B62B 5/0438 |
| | | | 482/68 |
| 6,378,883 B1 * | 4/2002 | Epstein | A61H 3/04 |
| | | | 180/65.6 |
| 7,229,093 B1 * | 6/2007 | Carter | B62B 3/022 |
| | | | 280/651 |
| 8,708,363 B1 * | 4/2014 | Chang | A61H 3/04 |
| | | | 280/647 |
| 9,211,000 B1 * | 12/2015 | Storkel | A61H 3/00 |
| 9,221,486 B2 * | 12/2015 | Fine | B62B 5/0003 |
| 9,573,610 B1 * | 2/2017 | Chaturvedi | B62B 3/005 |
| 9,642,767 B1 * | 5/2017 | Kavanagh | A61H 3/00 |
| 9,808,394 B1 * | 11/2017 | Jiang | A61H 3/04 |
| 10,081,381 B2 * | 9/2018 | Lin | B62B 3/022 |
| 10,106,182 B2 * | 10/2018 | Camarco | B62B 5/0003 |
| 10,232,867 B1 * | 3/2019 | Jones | B62B 3/1404 |
| 10,512,584 B2 * | 12/2019 | Goodsell | A61H 3/04 |
| 11,001,285 B1 * | 5/2021 | Gayk | B62B 1/002 |
| 2002/0011719 A1 * | 1/2002 | Eskridge | B62B 1/12 |
| | | | 280/47.35 |
| 2003/0038457 A1 * | 2/2003 | Eskridge | B62B 3/04 |
| | | | 280/648 |
| 2005/0140119 A1 * | 6/2005 | Wong | B62B 3/027 |
| | | | 280/651 |
| 2008/0185797 A1 * | 8/2008 | Bohn | A61H 3/04 |
| | | | 280/7.1 |
| 2009/0206569 A1 * | 8/2009 | Begin | B62B 3/04 |
| | | | 280/47.35 |
| 2013/0049311 A1 * | 2/2013 | Metters | B62B 3/027 |
| | | | 280/33.998 |
| 2014/0232078 A1 * | 8/2014 | Kirby | A61H 3/04 |
| | | | 280/47.35 |
| 2015/0173994 A1 * | 6/2015 | Chen | A61H 3/00 |
| | | | 280/639 |
| 2015/0246751 A1 * | 9/2015 | Spivack | B62B 3/146 |
| | | | 383/38 |
| 2016/0213550 A1 * | 7/2016 | Opsetmoen | A61H 3/04 |
| 2017/0071815 A1 * | 3/2017 | Goodsell | A61H 3/04 |
| 2017/0088154 A1 * | 3/2017 | Lin | B62B 3/027 |
| 2017/0166229 A1 * | 6/2017 | Camargo | B62B 1/12 |
| 2020/0406947 A1 * | 12/2020 | Hofmann | B62B 3/04 |

FOREIGN PATENT DOCUMENTS

| | | | | |
|---|---|---|---|---|
| DE | 102021101948 A1 * | 7/2022 | | |
| EP | 729737 A1 * | 9/1996 | | A61H 3/04 |
| FR | 2885581 A1 * | 11/2006 | | B62B 3/027 |
| JP | H08257064 A * | 10/1996 | | |
| WO | WO-9525022 A1 * | 9/1995 | | A61H 3/04 |
| WO | WO-0222070 A2 * | 3/2002 | | A61G 5/08 |
| WO | WO-2009154620 A1 * | 12/2009 | | A61H 3/04 |
| WO | WO-2010001398 A1 * | 1/2010 | | B62B 3/027 |
| WO | WO-2011151482 A1 * | 12/2011 | | B62B 1/002 |
| WO | WO-2015021537 A1 * | 2/2015 | | B62B 1/12 |
| WO | WO-2015111810 A1 * | 7/2015 | | A61H 3/04 |
| WO | WO-2015134312 A1 * | 9/2015 | | A61H 3/04 |
| WO | WO-2015188321 A1 * | 12/2015 | | B62B 3/02 |
| WO | WO-2021191565 A1 * | 9/2021 | | |

* cited by examiner

PERSONAL CART AND METHOD FOR USING

The present invention relates to devices for transporting objects, and in particular, to wheeled carts for transporting objects. This application claims the benefit of U.S. Provisional Application No. 62/868,148, filed Jun. 28, 2019, all of which is incorporated herein by reference.

BACKGROUND OF THE INVENTION

Shopping Carts

Shopping carts are well known and commonly used throughout the world on a daily basis. The prior art shopping cart typically has a basket area for holding purchased items, a handle for allowing a user to push the shopping cart and wheels connected to the shopping cart. The basket area in the prior art shopping cart traditionally has very high sides so as to allow the user to efficiently put a large number of items into the basket. Unfortunately, however, because of the high sides of the basket it can be difficult for many users to lift heavy items out the basket when it comes time to pay the cashier or when it comes time to move the heavy items into the user's vehicle.

Medical Rollators

FIG. 1 shows prior art medical rollator 10. Medical rollator 10 includes handles 12, seat 14, back rest 16, hand brakes 18 and wheels 20. Medical rollator 10 aids the user in walking by allowing the user to support himself by grabbing onto handles 17 for balance. Additionally, the user may sit in seat 14 to rest when he wishes. In one preferred embodiment, medical rollator 10 has a length of approximately 27.5 inches and a width of approximately 24.5 inches. The handle height is adjustable between 32 inches and 37 inches. Wheels 20 are approximately 6 inches in diameter. When not in use, medical rollator 10 is foldable for easy transportation and storage

Tote Bags

FIGS. 2 and 3 show prior art foldable tote bag 24. In one embodiment, prior art tote bag 24, when unfolded, has a height of approximately 10.5 inches, a length of approximately 13 inches and a width of approximately 10 inches (FIG. 2). FIG. 3 shows tote bag 24 in its folded state having a length of approximately 13 inches and width of approximately 10 inches.

What is needed is a better personal cart.

SUMMARY OF THE INVENTION

The present invention provides a personal cart and method for using the personal cart. The personal cart has a platform support frame. Wheels are rotatably connected to the platform support frame. A handle is also attached to the platform support frame. A rectangular platform is rigidly connected to the platform support frame. The platform has a raised railing extending upwards along the outer perimeter of the platform. In a preferred embodiment the platform support frame is foldable. Also, in a preferred embodiment a plurality of tote bags is placed on the platform. Each tote bag laterally supports another tote bag and the plurality of tote bags is also laterally supported by the raised railing.

DETAILED DESCRIPTION OF THE PREFERRED EMBODIMENTS

Personal cart 50 (FIG. 4) serves as a viable and more sanitary alternative to using traditional shopping carts. It eases the task of transporting purchases from the store, to the car, and into the house or apartment. The specific dimensions of personal cart 50 may vary depending upon the preferences of the user. In one preferred embodiment, personal cart 50 has a length of approximately 24.0 inches and a width of approximately 24.5 inches. The handle height is adjustable between 32 inches and 37 inches. Wheels 20 are approximately 6 inches in diameter. Personal cart 50 may be produced in various sizes, shapes, designs, styles, and colors.

Some appealing features of personal cart 50 include its space-saving design, its convenience, its durability, its effectiveness, its practicality, its novelty, its versatility, and its portability. Personal cart 50 is also time-saving, energy-saving, light weight, and compact in size. Personal cart 50 is used to store, organize, and transport purchases with ease and minimal effort. Personal cart 50 appeals to individuals who desire to simplify their grocery shopping routine, as well as other tasks around the domicile. Personal cart 50 streamlines the checkout at self-checkout lines, particularly those with self-scanners (scan, bag, and go), used at a large supermarket chain that have 8.5 million shoppers on a daily basis. It is common for shoppers to visit markets approximately 1.5 days a week.

Personal cart 50 is very needed in modern world society. Reasons include: there are 134.0 million households in America, there are over 175.0 million households in Europe, there are over 8.0 million households in Australia, 349 cities in America have banned plastic bags, dozens of countries have banned plastic bags.

Figure 1:
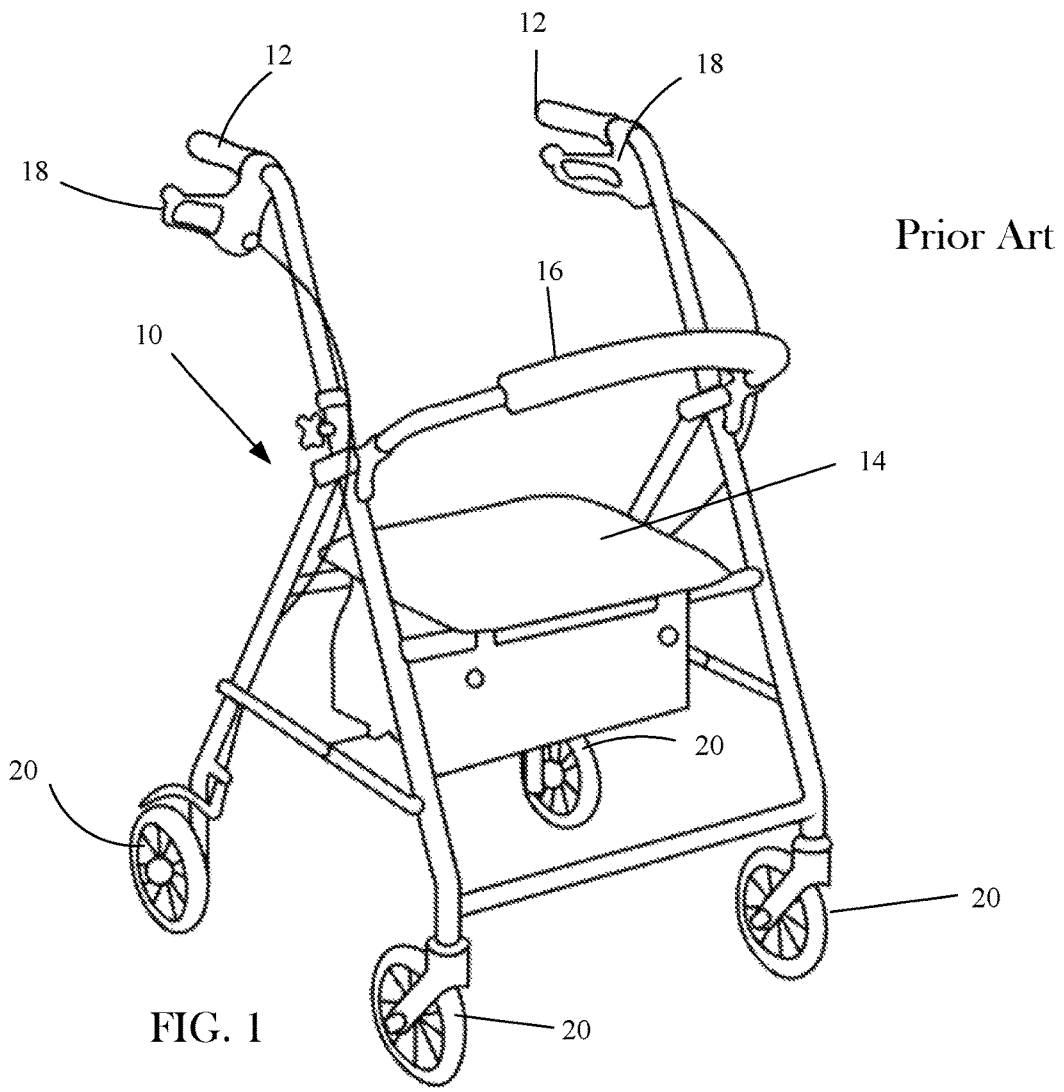
FIG. 1 shows a prior art medical rollator.
Figure 2:
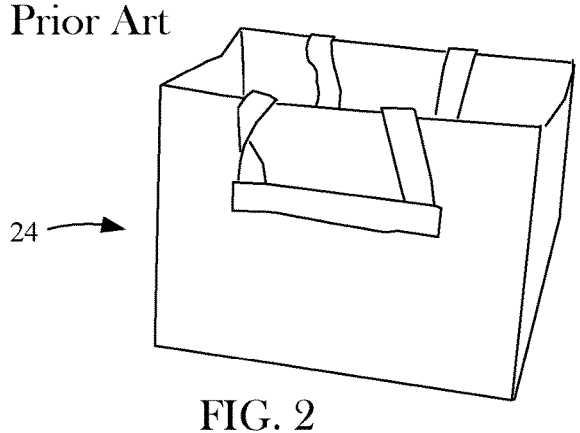
FIGS. 2-3 show a prior art rectangular foldable tote bag.
Figure 3:
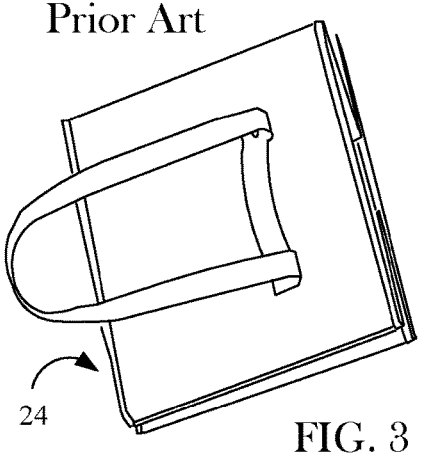
Figure 4:
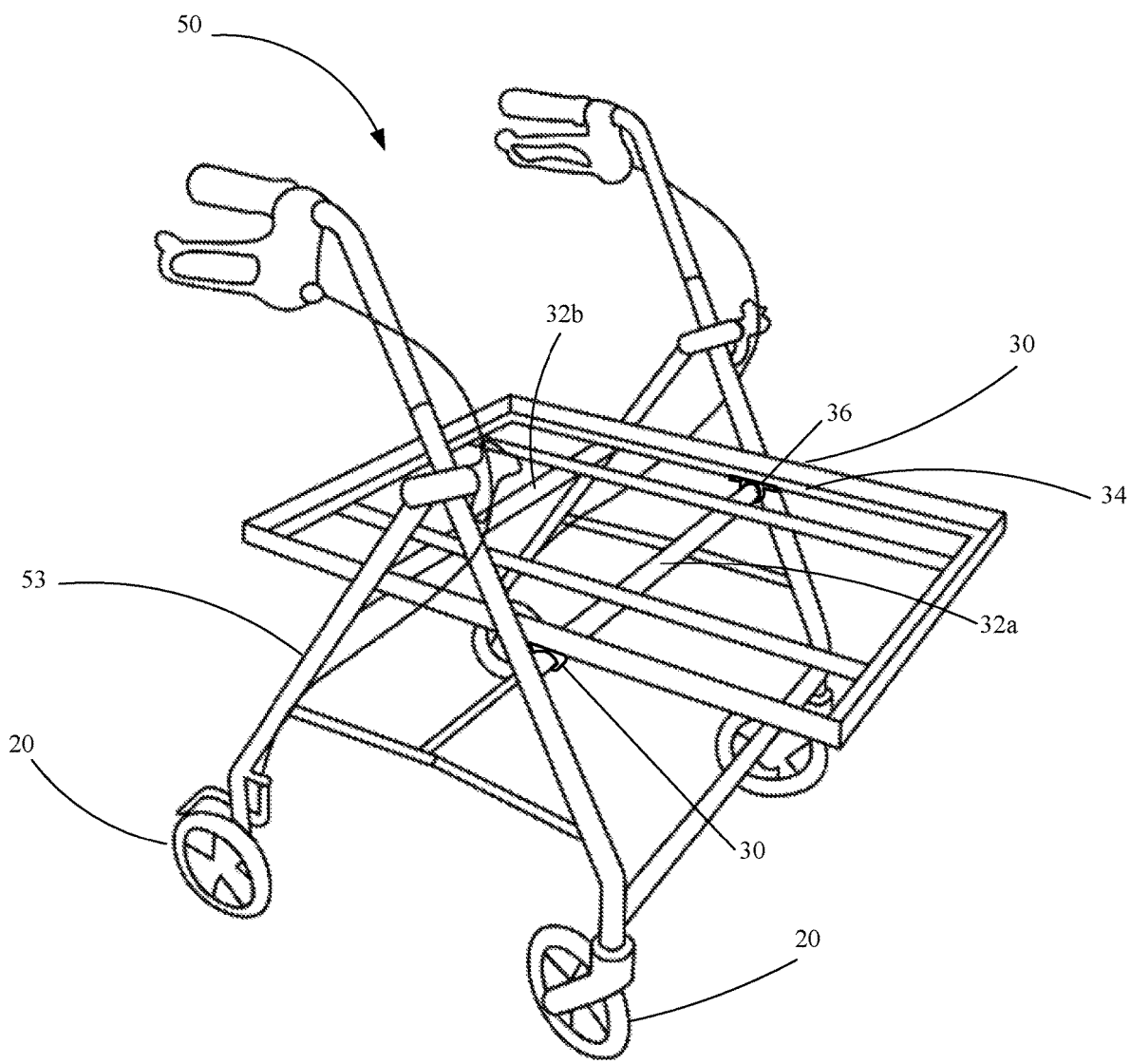
FIG. 4 shows a preferred embodiment of the present invention.
Figure 4B:
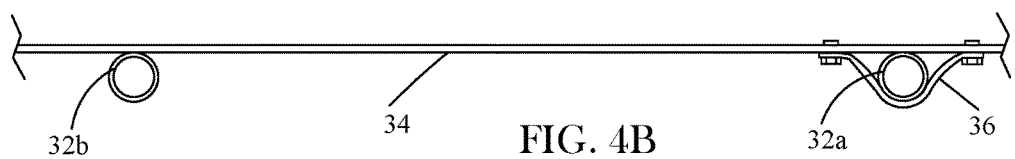
FIG. 4B shows a preferred method for connecting the platform to the platform support frame.

FIG. 4 shows a preferred cart 50. In the preferred embodiment shown, seat 14 and back rest 16 have been removed from medical rollator 10 (FIG. 1) to form wheeled platform support 53. Platform 30 has been rotatably connected to cross bar 32a of platform support frame 53. As shown in FIG. 4B, outer lip 34 of platform 30 have been rotatably connected to cross bar 32a by utilization of bolted connection straps 36. Outer lip 34 is also shown resting on crossbar 32b and ready for use. When cart 50 is folded, from the position shown in FIGS. 4 and 4B, platform 30 will rotate in a clockwise direction about cross bar 32a.

In one preferred embodiment platform 30 is fabricated from ⅛-inch gauge aluminum. Platform 30 includes 1-inch-high railing 35 that borders the perimeter of platform 30. In a preferred embodiment, platform 30 is approximately 20.25 inches wide and 26.25 inches long.

Figure 5:
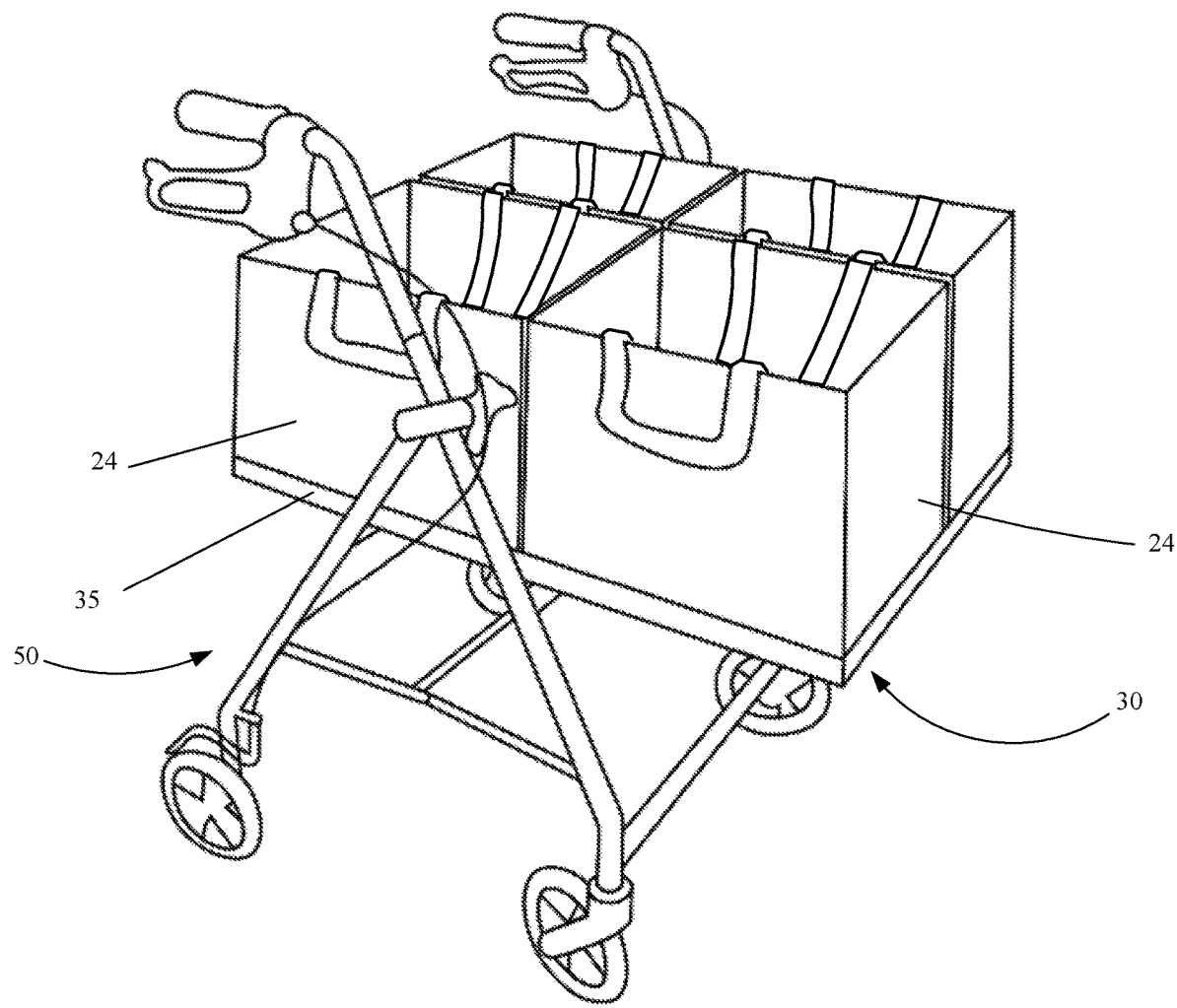
FIG. 5 shows a plurality of tote bags resting on the platform.

In FIG. 5 a user has placed four tote bags 24 onto platform 30 of cart 50. In a preferred embodiment, tote bags 24 are reusable thereby eliminating the use of plastic bags that have a detrimental effect on the environment. Moreover, the use of four tote bags significantly reduces the number of times purchased items are handled.

As shown in FIG. 5, tote bags 24 are snuggly placed on top of platform 30 and support each other and are further supported by 1-inch railing 35. In a preferred embodiment railing 35 is very low (preferably no higher than 3 inches). The low height of railing 35 permits easy removal and insertion of filled tote bags 24 that may be heavy and difficult for the user to lift. Cart 50 is now ready for usage. For example, a user may now decide to go shopping with cart 50 and place groceries inside tote bags 24.

Figure 6:
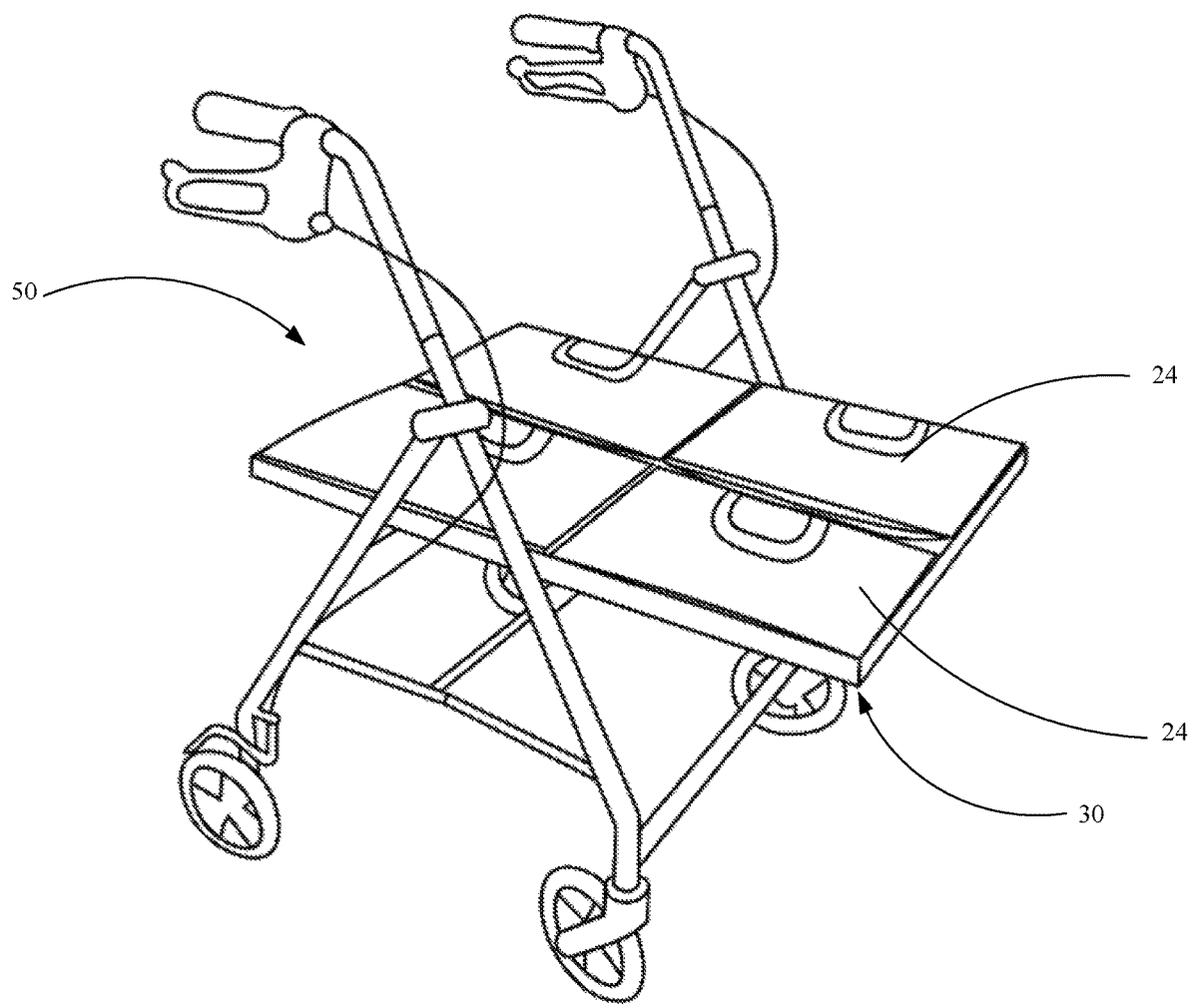
FIG. 6 shows folded tote bags resting on the platform.

In FIG. 6, the user has finished using cart 50 and tote bags 24. Accordingly, the user has folded each tote bag 24 into the folded positions shown. The tote bags remain stowed on platform 30. In one preferred embodiment, small magnets are placed inside tote bags 24 to help keep tote bags 24 in position while folded. In a preferred embodiment, because aluminum has a weak attraction to magnets, magnetic tape is affixed to appropriate locations on platform 30.

Figure 7:
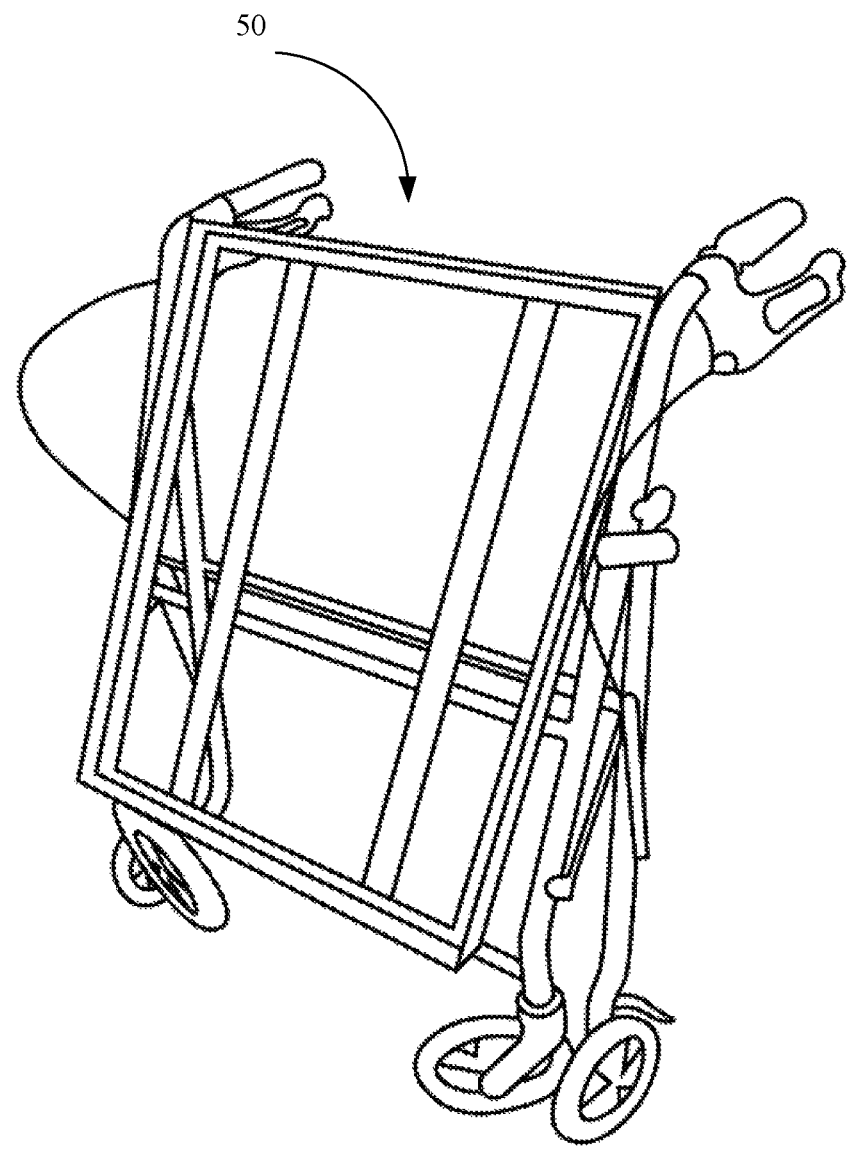
FIG. 7 shows a preferred embodiment of the present invention while folded.

In a preferred embodiment cart 50 is foldable. For example, FIG. 7 shows cart 50 folded. Cart 50 may now be conveniently stowed or transported.

Utilization of the Improved Personal Cart

Example

In one preferred embodiment of the present invention a user places folded cart 50 (FIG. 7) into his vehicle and drives to a market to purchase groceries. Once at the market the user removes folded cart 50 from his vehicle and unfolds cart 50, as shown in FIG. 4. The user then places tote bags 24 into cart 50 and folds the bags (FIG. 6). The user then pushes cart 50 into the market. Once inside the market the user unfolds tote bags 24 (FIG. 5). The user then commences to load groceries into tote bags 24. After purchasing the groceries, the user pushes cart 50 back out to his vehicle. Tote bags 24 are full of groceries. He removes tote bags 24 from cart 50 and places them in his vehicle. He folds cart 50 again (FIG. 7), also places cart 50 inside the vehicle and drives home. Once at home the user removes folded cart 50 from his vehicle and unfolds cart 50, as shown in FIG. 4. The user then places tote bags 24 (containing purchased groceries) into cart 50. The user then pushes cart 50 into his home and into the kitchen. He removes items from tote bags 24 and properly stores the purchased groceries in the kitchen. The user then folds cart 50 and tote bags 24 for storage. He may decide to store cart 50 and tote bags 24 in his home or in his vehicle.

In a preferred embodiment the user places like items in a particular tote bag while shopping. In this preferred embodiment the check-out cashier places the like items back into the particular tote bag after ringing up the user. The like items are therefore easy to stow when returning home from the market. For example, in one tote bag the user places breads and bakery items. In another tote bag the user places meats. In another tote bag the user places light bulbs and hardware items.

Other Uses of the Cart

Figure 8:
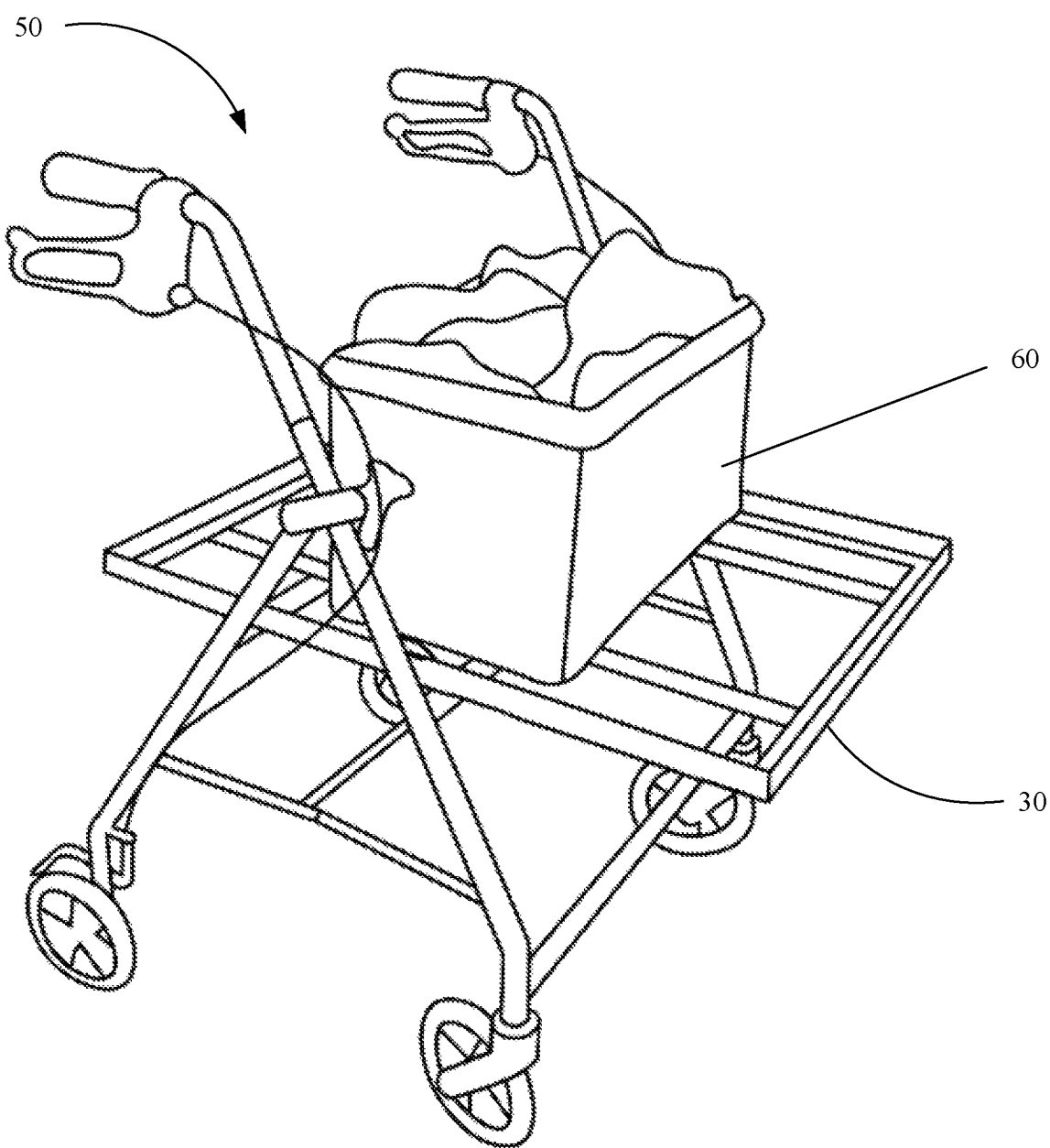
FIG. 8 shows a laundry basket placed onto a preferred embodiment of the present invention.

Although it was described in great detail how cart 50 may be used for the transportation of purchased groceries, it should be understood that cart 50 is very versatile and may be used for many tasks. For example, it can be used to transport anything that can be laid upon platform 30. As shown in FIG. 8, laundry basket 60 has been placed upon platform 30 and may now be easily transported. Other items that may be transported by cart 50 include: tools, potted plants, a television set, buckets of paint, a stack of books or magazines, computer equipment, and many more.

Folding of the Cart

Figure 9:
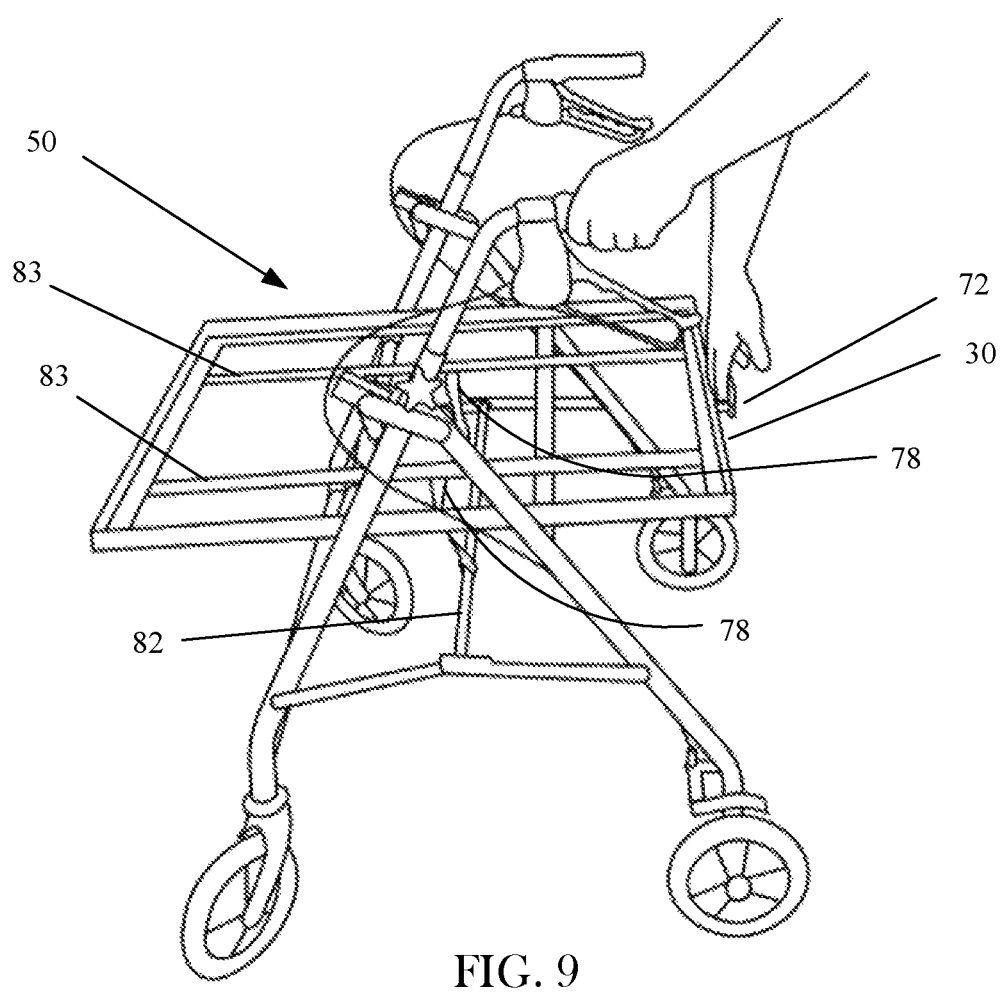
FIGS. 9-11 show a preferred method for folding a preferred cart.
Figure 10:
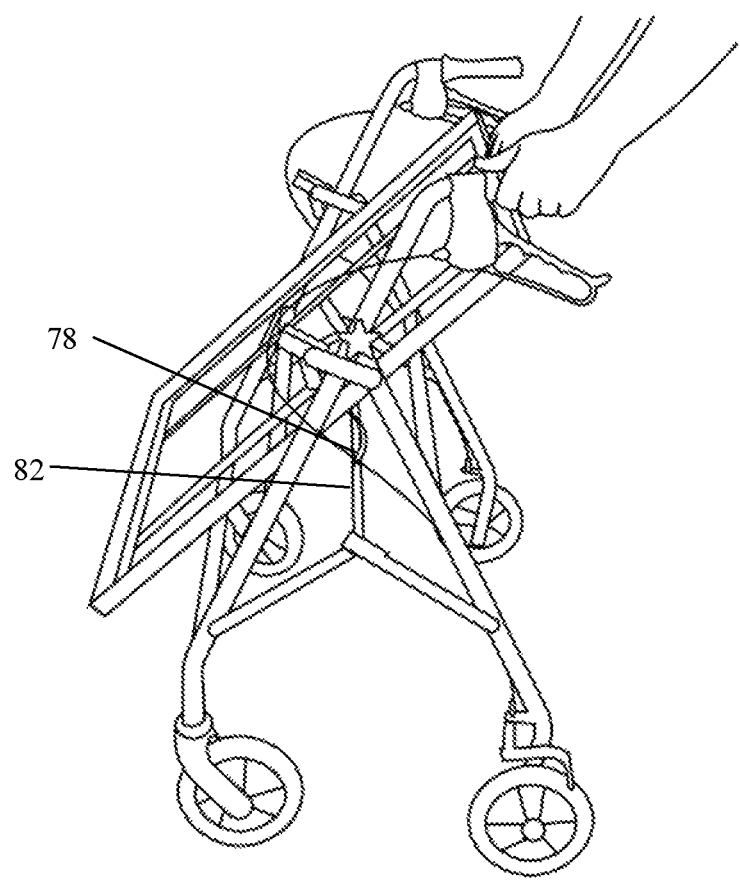
Figure 11:
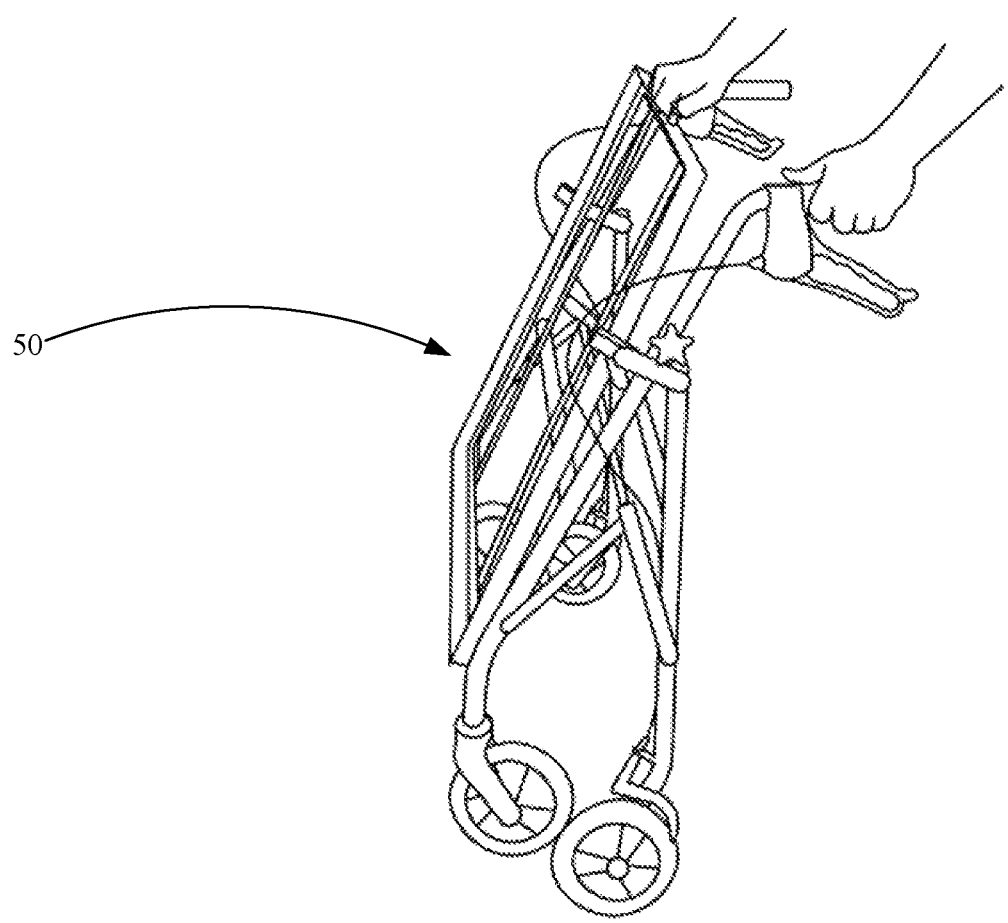

FIGS. 9-11 show a preferred method for folding cart 50. In the preferred embodiment shown, fold-actuating handle 72 is rigidly connected to the rear of platform 30. Fold-actuating straps 78 are connected between slats 83 of platform 30 and fold-actuating crossbar 82 of cart 50.

In FIG. 9 the user has approached cart 50. Using hand brakes 18, the user has locked rear wheels 20. The user has reached down and has grabbed handle 72.

In FIG. 10 using his right hand the user has pulled up on handle 72. Accordingly, straps 78 have pulled up on crossbar 82, causing cart 50 to begin to fold.

In FIG. 11, the user has finished pulling up on handle 72. Cart 50 is now in the folded position show earlier in FIG. 7.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A method for using a personal cart, comprising the steps of:
   A. acquiring a foldable personal cart, said foldable personal cart comprising:
      i. a platform support frame,
      ii. a plurality of wheels rotatably connected to said platform support frame,
      iii. at least one handle connected to said platform support frame, and
      iv. a platform rotatably connected to said platform support frame, said platform comprising a raised railing extending upward along the outer perimeter of said platform,
   B. unfolding said foldable personal cart,
   C. placing a plurality of rectangular tote bags onto said foldable personal cart, wherein at least one magnet is inserted into each said tote bag, wherein said plurality of tote bags are connected to said platform by magnetic force,
   D. pushing said personal cart into a grocery store,
   E. placing groceries into said tote bags,
   F. purchasing groceries,
   G. pushing said personal cart out of the grocery store,
   H. removing said tote bags from said platform, and
   I. folding said foldable personal cart.

2. The method as in claim 1, further comprising a fold-actuating handle rigidly connected to said platform wherein said cart is folded by lifting upwards on said handle.

3. The method as in claim 2, further comprising:
   A. at least one fold-actuating strap,
   B. at least one fold-actuating crossbar, wherein said at least one fold-actuating strap is connected between said platform and said at least one fold-actuating crossbar.

4. The method as in claim 1, wherein said platform support frame is foldable.

5. The method as in claim 1, wherein said raised railing is approximately one inch in height.

6. The method as in claim 1 wherein said raised railing is approximately three inches or lower in height.

7. The method as in claim 1, wherein said platform is rigidly connected to said platform support frame via bolted connection straps.

8. The method as in claim 1, wherein said plurality of rectangular tote bags laterally support one another and are further laterally supported by said raised railing.

* * * * *